May 19, 1964 R. M. HARDGROVE 3,133,804
APPARATUS FOR TREATING MOLTEN ASH OR SLAG
Filed June 13, 1960 2 Sheets-Sheet 2

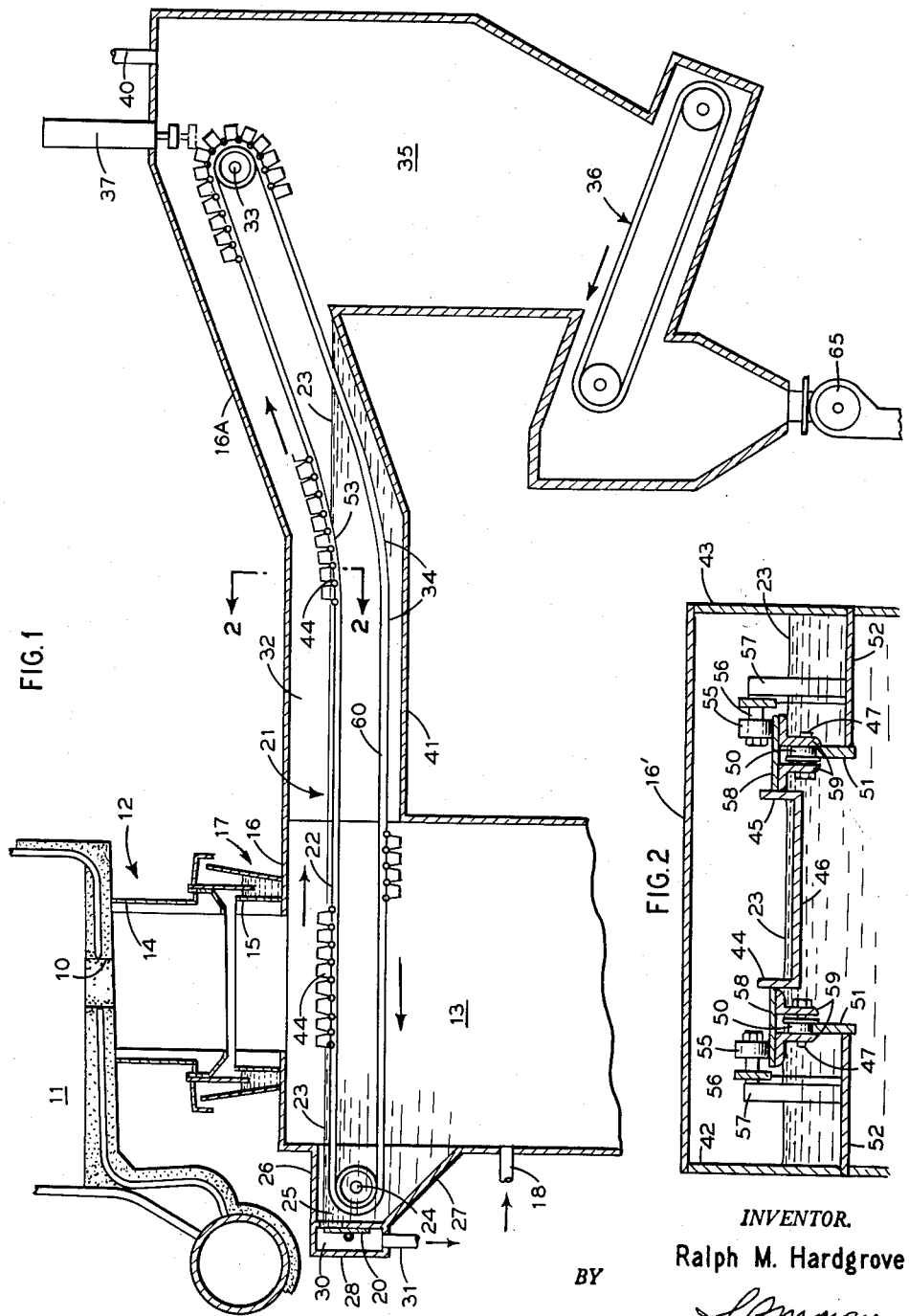

INVENTOR.
Ralph M. Hardgrove
BY
ATTORNEY

United States Patent Office 3,133,804
Patented May 19, 1964

3,133,804
APPARATUS FOR TREATING MOLTEN ASH OR SLAG
Ralph M. Hardgrove, North Canton, Ohio, assignor to The Babcock & Wilcox Company, New York, N.Y., a corporation of New Jersey
Filed June 13, 1960, Ser. No. 35,522
4 Claims. (Cl. 65—141)

The present invention relates to an apparatus for the treatment of the slag produced in the combustion of an ash containing solid fuel. More particularly, this invention relates to the useful disposal of the ash produced during the combustion of coil under slagging conditions, where the molten slag is controllably cooled to produce a dense, solid material which may be crushed to form a product, such as aggregate that can be used for construction purposes.

In the generation of electric power, the majority of a substantial number of the central stations burn coal in either pulverized form, or in a crushed form, as a source of heat, and disposal of the ash from the fuel generally presents a problem. In some of the larger central station plants, the amount of ash which must be disposed of may be of the order of thousands of tons per year. With one widely used furnace type, i.e. the slag tap type, a major portion of the ash in the fuel may be recovered in a molten form. Thus, it would be highly desirable to produce a commercially attractive, marketable product from the molten coal ash slag.

Heretofore, it has been customary to discharge molten slag into bodies of liquid, such as water, to granulate the slag and to then transport the granulated slag in a liquid carrier medium for use as land fill, or for any other purpose where the granulated slag, wet or dry, may be useful. When slag is granulated by this process, the particles are small and generally brittle varying between $\frac{1}{16}$ and of $\frac{1}{4}$ of an inch in size and because of its brittle nature, the material is not particularly suitable for commercial purposes.

In the present invention, the treatment of the molten slag is performed according to a preferred procedure for cooling the slag so as to form slabs, or relatively large chunks, of solidified slag which may be crushed or reduced in size to form a coarse granular product. The resultant product is an aggregate considerably tougher, and of coarser texture, than the granulated slag heretofore produced. This is accomplished by discharging the molten slag stream into a relatively thin ribbon of water which covers a section of the conveyor. Due to the limited amount of water contacted by the molten slag, the rate of solidification of the slag is slower than if the molten material were discharged directly into a tank of water and the usual bloating effect associated with the latter method of cooling is avoided or greatly reduced. The cooling effect of the ribbon of water, however, is sufficient to solidify the slag so that the material leaving the conveyor is cooled to at least a plastic stage and can be handled as a solid. Thereafter, the slag will be air cooled and crushed, or otherwise reduced in size, to form a tough, coarse textured, relatively dense granular product satisfactory for use as concrete aggregate, for example. In a modification of my invention, the air cooling step for the production of the granular material may be performed under forced draft conditions with the air used for cooling the slag being heated for use in the fuel combustion process with a resultant improvement in the overall heat efficiency of the combustion process, while retaining the improved commercial qualities of the slag.

The various features of novelty which characterize my invention are pointed out with particularity in the claims annexed to and forming a part of this specification. For a better understanding of the invention, its operating advantages and specific objects attained by its use, reference should be had to the accompanying drawings and descriptive matter in which I have illustrated and described a preferred embodiment of the invention.

In the drawings:

FIG. 1 is an elevation, partially in section, of a slag cooler constructed and arranged in accordance with the present invention;

FIG. 2 is a section taken along line 2—2 of FIG. 1.

Figure 4:
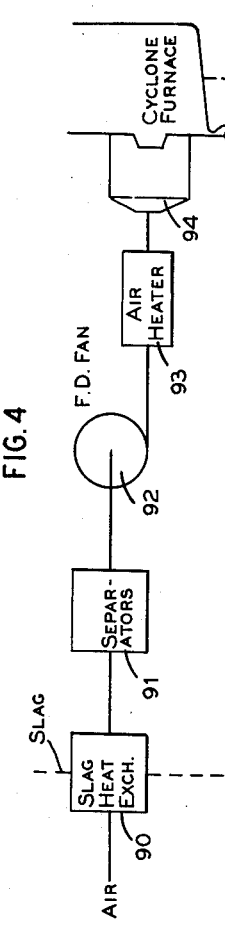
FIG. 4 is a schematic illustration of the cycle for treatment of slag and preheating of the air used for combustion in the cycle.
Figure 3:
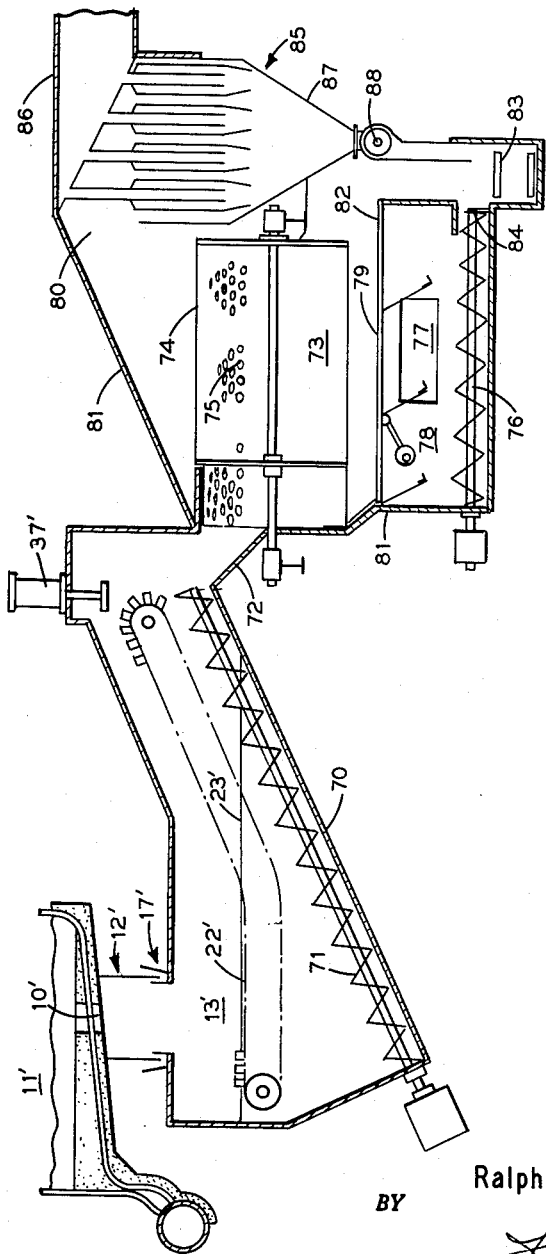
FIG. 3 is an elevation, partially in section, of a modified form of slag cooler.

The embodiment of the invention shown in FIG. 1 contemplates the final cooling of the solidified slag during transportation to and retention in a storage pile prior to final crushing. However, the slag cooling process may be accelerated with the heated air thereafter used as combustion air in burning the ash containing fuel, with resulting improvement in heat cycle efficiency. The latter is shown in FIGS. 3 and 4.

While the invention may be applied to the treatment of molten non-combustibles obtained from various types of furnaces, it is particularly applicable to the treatment of the molten non-combustible constituents resulting from the high temperature combustion of ash containing solid fuels, such as bituminous coal. The solid fuel may be burned in suspension, in pulverized form, or it may be burned in granular form in a cyclone furnace, such as shown in the Bailey et al. U.S. Patent 2,357,301. When burned in a cyclone furnace, the non-combustible constituents of the coal are largely separated from the combustion gases in the furnace and are discharged therefrom in molten form. In many installations, as much as 90% of the non-combustible in the fuel fired is removed as a molten ash stream from the cyclone furnace, the quantity of ash amounting to 15 tons or more per hour. As disclosed in the said patent, granular fuel is burned in a cyclone furnace, where a major portion of the non-combustible constituents of the granular fuel is removed from the furnace in molten form. In leaving the cyclone furnace, the molten slag flows through a secondary combustion chamber and is discharged through a slag outlet positioned in the lower portion of the secondary combustion chamber. The molten slag flows from the outlet in a generally uniform fluid stream, although it will be understood the rate of flow and the fluidity of the slag will change with changing fuel rates and combustion conditions in the cyclone furnace, and in the secondary combustion chamber, and with variations in the characteristics of the fuel fired.

As shown in FIG. 1 of this application, the molten slag outlet 10 in the lower portion of a secondary combustion chamber 11, such as shown in said patent, directs the flow of the slag downwardly under the influence of gravity through an enlarged enclosure 12 into a slag tank 13. The enclosure 12 is constructed in two separate parts with the upper part 14 connected to the floor of the secondary furnace 11 in spaced radial relation to the opening 10. The lower part 15 of the enclosure 12 is mounted on and attached to the cover plate 16 of the slag tank 13 and is in aligned relationship to the upper part 14. The seal 17 is of conventional design and interconnects the upper and lower parts of the enclosure so as to form a gas tight seal therebetween while permitting thermally induced movement between the chamber or furnace 11 and the slag tank 13. The tank 13 is filled with water, the level of the water being maintained substantially constant by means of a valved water inlet connection 18 and an adjustable overflow gate 20. Alternatively, the level of water within the tank may be maintained by a float control, or other suitable devices known in the art. The tank 13 is constructed of sufficient cross sectional dimensions so as to allow slag to run over the sides of the conveyor 21 of the present invention when an unusual operating condition causes an excessive amount of slag to be discharged through the outlet 10. This may be occasioned by changes in the slagging conditions in the combustion space of the furnace, as, for example, in the cyclone furnace (not shown) or in the secondary furnace 11.

A typical width of conveyor for handling molten ash at a rate of approximately eight tons per hour may be 4 feet. Under such conditions the transverse dimension of the slag tank 13 may be 10 to 12 feet. Any slag overflowing the conveyor into the tank 13 will be granulated and removed from the tank by conventional means, such as a screw conveyor (not shown).

In the apparatus of the invention, a pan type conveyor 21 is horizontally disposed within the upper portion of the slag tank 13, with the ash receiving surface of the upper run 22 of the conveyor positioned immediately below the level 23 of water within the tank. In the normal mode of operation, the water level in the tank is maintained to provide approximately ½" of water on top of the surface of the upper run 22 of the conveyor. The tail shaft 24 of the conveyor is positioned in an offset vestibule 25 at one side of the slag tank 13. The vestibule is enclosed with a cover plate 26, an inclined bottom 27 and sidewalls merging into the wall of tank 13. As shown, the outer end wall 28 is spaced from the adjustable water overflow-gate 20 to provide a pocket 30 arranged to receive the overflow water which is withdrawn therefrom by a discharge pipe 31. With this construction the tail shaft 24 and the end of the conveyor are substantially out of the path of movement of the slag deposited upon the conveyor 21. The conveyor 21 extends in a horizontal direction through an enclosed extension 32 which is formed on the side of the slag tank 13 opposite the vestibule 25. At a pre-selected location, approximately the equivalent of a maximum cross sectional dimension of the tank, and beyond the wall of the slag tank, the conveyor 21 is upwardly inclined as, for example, at an angle of 20° toward the drive sprocket 33 of the conveyor. The upward inclination of the conveyor extends above the water level 23 maintained in the slag tank and the extension 32 so that the drive sprocket and a portion of the conveyor are above the water level 23. The conveyor, in travelling around the drive sprocket 33 discharges the slag it has transported into a closed container 35. Having completed their travel, the conveyor pans return along a lower run 34 to the inlet end of the conveyor.

As shown in FIG. 1, the container 35 is provided with a separate conveying mechanism 36, positioned at the bottom of container 35, for the removal of the slabs or chunks of slag. The conveyor 36 may be of the metal belt type, or of any other usual construction since it will be handling substantially dry and relatively cool material. Thereafter, the slag will be crushed and transported to point of use.

Since the molten slag is solidified due to the action of the water into a semi-continuous ribbon or slab on the conveyor 21, it is desirable to provide a mechanism for breaking the slab portions discharging from the conveyor 21. This is accomplished in the illustrated embodiment of the invention by means of pneumatic or hydraulic power piston 37 which is operated, for example, at a frequency of 3 or 4 strokes per minute. The amplitude of the piston movement is sufficient to impact the slab or sheet of solidified slag moving with the conveyor and to clear such slab when the piston is retracted. The impact on the slab breaks the slag into smaller pieces, so that with the arrangement described, the chunks of solidified slag discharged by conveyor 36 from the container 35 will be, for example, 4 to 6 inches in maximum dimension and will provide a reasonable size of feed for discharge through a sealing-feeding device 65 and subsequent delivery to an associated crusher (not shown). The slag is further cooled by radiation in the container 35 and by convection heat exchange with air after discharge from the feeder 65.

Since the secondary furnace 11 may be operated at pressures above or below atmospheric, the slag tank and conveyor extensions are completely enclosed, with a vent 40 positioned in the highest point in the container 35 for the regulation of pressure within the system and for the removal of gaseous fluids when the system is in operation. As shown in FIG. 1, the conveyor extension 32 is provided with an extension of top plate 16, such as 16A, and a bottom plate 41 which are attached at opposite ends to the tank 13 and the container 35. The top plate 16A and bottom plate 41 are connected by side plates 42 and 43 which are shown in FIG. 2, the side plates extending from tank 13 to container 35.

As shown in FIGS. 1 and 2, the pan type conveyor illustrated in the drawings is provided with edges 44 and 45 which extend upwardly to confine the lateral movement of the molten slag as it is deposited on the conveyor from the slag outlet 10. As hereinbefore pointed out, variations in the operation of the furnace may result in occasions when the slag stream will discharge at an accelerated rate and overflow the edges 44 and 45 of the pan conveyor. The excess slag will then fall into the slag tank 13 without damage to the conveyor.

It is recognized that one of the most difficult problems encountered in service of the type described occurs when an excessive amount of iron compounds or iron and sulphur compounds are discharged with the slag through the outlet 10. Lacking the cooling protection of the film of water on the conveyor, such concentrated flows would destroy the conveyor.

As shown in the drawings, the pan conveyor of the illustrated embodiment is constructed with shallow pans where the sides 44 and 45 may be 8" high and the base 46 may be 4' wide. Each pan is pivotally connected to an adjoining pan, with the pivot pin 47 serving as the axle of a flanged roller 50. Each roller rolls upon a rail 51 which in turn is supported on a structural member 52 and is framed into the corresponding side walls 42 and 43 of the conveyor enclosure. The upwardly inclined discharge end portion of the conveyor is provided with a relatively long radius transition curve where it merges with the horizontally extending portion of the conveyor. The curved portion 53 of the rails 51 has sufficient radius to avoid interference between the edges 44 and 45 of adjoining pans of the conveyor during that portion of the travel where there is a change of direction of the conveyor. As shown in FIG. 2, the conveyor supports adjacent the curved rail portion 53 include a series of upper rollers 55 mounted on shafts 56 supported from upright brackets 57. The brackets 57 are secured to the members 52 by welding, or otherwise, so as to position the rollers 55 in guiding contact with the upper surface of the flanges 58. The flanges 58 are formed as part of sides 44 and 45, and are interconnected by angle brackets 59 in which the pin 47 and roller 50 are mounted. With the construction described, the upper run of the conveyor is supported and guided in its movement from the tank 13 to the container 35. The lower run 60 of the conveyor may be frictionally guided by metal strips, or may also be supported by rollers (not shown).

In the operation of the slag handling device disclosed, the conveyor is operated at speeds between 2 and 15 feet per minute to provide a slag cooling time of, say, 10 minutes. When the conveyor operates with a film of water as here disclosed, the slag will be cooled at a much slower rate than if it were dropped directly into a tank of water. It, however, will be fairly well solidified by the time the slag ribbon has moved to the upwardly curved rail portion 53. As the ribbon of slag moves upwardly toward the discharge end of the conveyor the pans leave the water. At this point, the temperature of the slag has been reduced to such an extent that there is no possibility of damage to the conveyor due to elevated temperatures. As the ribbon of slag leaves the conveyor, the operation of the power piston 37 will break the slag into chunks for discharge to the conveyor 36. As the conveyor pans pass along the lower run 60, the conveyor is further cooled by submergence in water.

In normal operation of the slag conveyor, the slag produced will be tough (i.e. not brittle, in that substantial breakage will not occur in handling) and will have a density of 80 to 90 pounds per cubic foot. Under stabilized furnace operating conditions, changes in the speed of the conveyor will affect the thickness of the slag ribbon formed. It has been found that even with 2 or 3 inches of slag ribbon thickness on the conveyor the rate of cooling does not have a pronounced effect on the density of the product, although, in general, a slower conveyor speed with a slower cooling rate will tend to increase the density of the slag product.

In the modification of the invention shown in FIG. 3, the water film cooling of the slag is accomplished as described in connection with FIGS. 1 and 2. As shown in FIG. 3, the tank 13' is of generally rectangular horizontal cross-section. It is provided with an inclined bottom plate 70 with a screw conveyor 71 positioned upwardly adjacent the bottom plate for the removal of any granulated slag which may fall through the conveyor 22' and accumulate in the bottom of the tank.

The film cooling apparatus of FIG. 3 functions in the same manner as described in connection with FIGS. 1 and 2 with a stream of molten ash or slag moving from chamber 11' by gravity through an opening 10' to be deposited upon the conveyor 22'. In moving through the opening 10', the molten slag stream flows through enclosure 12', which is equipped with flexible connection 17' similar to that disclosed in connection with FIG. 1. After the slag is solidified on the conveyor 22', it is discharged from the end thereof and broken into chunks or slabs by a pneumatic or hydraulic power piston 37'. The chunks of slag discharged from the end of the conveyor 22' are combined with the granulated slag discharged by the screw conveyor 71 and move by gravity through a spout 72.

In leaving the spout 72, the slag mixture enters a rotary breaker 73 where the oversized chunks of slag are reduced in size by tumbling action resulting from the rotation of the breaker. The circumferential wall 74 of the rotary breaker is perforated for the escape from the breaker of selected sizes of slag particles. For example, the rotary breaker may be provided with perforations 75 of from 1 to 2" in diameter. The slag particles discharged through the circumferential wall 74 of the rotary breaker fall by gravity onto a shaking grate 79 located immediately below the breaker. The shaking grate is of known construction wherein provision is made for the upward passage of gaseous cooling fluid through the grate and through the layer of slag thereon, while the slag is gradually moved toward the discharge end 82 thereof.

As shown in FIG. 3, the housing 81 enclosing the rotary breaker 73 and the shaking grate 79 also accommodates a screw conveyor 76 extending along the bottom surface thereof so that any fine materials which have passed through the shaking grate 79 and which would tend to accumulate on the bottom of the housing may be removed by means of the conveyor 76.

A cooling air inlet opening 77 is positioned beneath the shaking grate 79. The air introduced through the opening 77 is delivered under controlled pressure conditions to maintain a balanced pressure in the slag treating system. The air entering the space 78 below the shaking grate passes upwardly through the grate, with a portion thereafter passing through the rotary breaker, all of the air finally discharging through an opening 80 in the upper portion of the housing 81, which encloses the rotary breaker and the shaping grate. In passing through the shaking grate 79 and the rotary breaker 73, direct contact of the slag and the air causes the slag to give up heat and thereby impart preheat to the air. The cooled slag leaving the discharge end 82 of the shaking grate falls by gravity to the upper surface of a pan or belt conveyor 83 immediately below the discharge end 84 of the screw conveyor 76. Thus, the coarse slag particles, after moving across the surface of the shaking grate 75, are combined with the finer particles transported by the screw conveyor 76 on conveyor 83 for discharge from the apparatus.

The preheated air discharging through the opening 80 is divided into a plurality of parallel streams for passage through a dust collector or separator, which may be of the multiclone type. It will, of course, be understood that other forms of solid-fluid separators may be used, but a multiclone such as illustrated in FIG. 3 is effective and economical for the service indicated. The cleaned, preheated air leaving the dust separator 85 discharges through a duct 86 for subsequent use in the combustion process. The dust or slag particles, separated from the air in the multiclone, are collected into a frusto-conical hopper 87 positioned in the lower portion of the multiclone assembly from which they are withdrawn through a star type feeder 88 or an equivalent sealing device, for discharge to the conveyor 83.

It will be appreciated that the slag discharged to the rotary breaker 73 may be at a temperature of 500 to 800° F. and that the air passing in direct contact with the slag particles may be heated as much as several hundred degrees. The temperature of the preheated air discharged through the outlet duct 86 depends on a number of variable factors, e.g. the quantity and temperature of the incoming air and the quantity and temperature of the slag contacting the air. Because of these variables, it may be necessary to further process the air leaving outlet duct 86 in order to obtain the air desired for combustion. As shown in FIG. 4, a line diagram of the air flow and slag flow is indicated in its simplest form for purposes of illustration. The slag heat exchanger, indicated in the drawing as block 90, is representative of the rotary breaker 73 and shaking grate 79 shown in FIG. 3. Air passed through the slag heat exchanger passes through separators indicated by the block 91 in FIG. 4 for the removal of the dust from the air. In FIG. 3, the separators are represented as multiclones. The air leaving the separators is passed through a forced draft fan indicated at 92 with the discharge from the fan connected with an air heater 93 which may be in the flow path of the partially cooled gaseous products of combustion discharged from a vapor generating and superheating unit. In the air heater, the combustion air is heated to a desired temperature level, such as 500 to 600° F. and introduced into a cyclone furnace 94 where the ash bearing fuel is burned. From the cyclone furnace, the molten slag is discharged into a secondary combustion chamber such as chamber 11' with the slag thereafter passed through the slag heat exchanger, block 90 of FIG. 4, thence in conditioned form to storage for ultimate use.

The applicant has discovered that the desirable slag conditioning effect of water film cooling is not drastically changed, insofar as the desired finished slag product is concerned, by either slow air cooling, as illustrated in FIG. 1 version of the invention where the slag cooling is by radiation and convection heat transfer to substantially stagnant air, or by the relatively rapid cooling by forced air movement as illustrated in FIG. 3. Apparently, the critical cooling effect occurs during the initial stages of solidification of the molten slag while it is in contact with the film of water and entirely acceptable commercial slag having the characteristics as here described can be produced by the systems shown in either FIG. 1 or FIG. 3.

While in accordance with the provisions of the statutes I have illustrated and described herein the best form and mode of operation of the invention now known to me, those skilled in the art will understand that changes may be made in the form of the apparatus disclosed without departing from the spirit of the invention covered by my claims, and that certain features of my invention may sometimes be used to advantage without a corresponding use of other features.

What is claimed is:

1. Apparatus for the controlled cooling of a stream of molten ash which comprises means defining an opening for the movement of a stream of molten ash downwardly therethrough, a cooling fluid containing tank positioned beneath said opening to receive said stream of molten ash, conveyor means positioned in the upper portion of said tank operable to move substantially horizontally across said tank from a molten ash receiving position beneath said opening to a solidified ash discharge position outside of said tank, and means for maintaining a level of cooling fluid within said tank to establish a film of cooling fluid on the upper surface of said conveyor within said tank to cool the conveyor and to slowly solidify the molten ash deposited on said conveyor.

2. Apparatus for the controlled cooling of a stream of molten ash which comprises means defining an opening for the movement of a stream of molten ash downwardly therethrough, closed cooling fluid containing tank means positioned beneath said opening to receive said stream of molten ash, a generally horizontally disposed conveyor means positioned in the upper portion of said tank operable to move across said tank from a molten ash receiving position beneath said opening to a solidified ash discharge position outside of said tank, means for maintaining cooling fluid in said tank with the upper level of fluid covering the ash receiving surface of a portion of said conveyor with a film of water, said conveyor means extending above the level of said cooling fluid for a portion of its length, means for controlling the rate of movement of said conveyor means to regulate the cooling rate of said ash by the film of water, and means for breaking the slab of solidified ash adjacent the discharge end of said conveyor.

3. Apparatus for the controlled cooling of a stream of molten ash separated from solid fuel during fuel combustion which comprises means defining an opening for the movement of a stream of molten ash downwardly therethrough, a closed cooling fluid containing tank positioned beneath said opening to receive said stream of molten ash, casing means enclosing the molten ash stream flowing from said opening into said tank, conveyor means positioned in the upper portion of said tank operable to move at a controlled rate across said tank from a molten ash receiving position beneath said opening to a solidified ash discharge position outside of said tank, means for maintaining cooling fluid in said tank with the upper level of said fluid covering the ash receiving surface of a portion of said conveyor with a film of water, said conveyor extending above the level of said cooling fluid for a portion of its length toward said discharge position, and means for breaking the slabs of solidified ash adjacent the discharge end of said conveyor.

4. Apparatus for the controlled cooling of a stream of molten ash separated from solid fuel during fuel combustion which comprises means defining an opening for the movement of a stream of molten ash downwardly therethrough, a water tank positioned beneath said opening to receive said stream of molten ash, casing means enclosing the molten ash stream flowing from said opening into said tank, an endless conveyor positioned in the upper portion of said tank operable to move its upper run across said tank from a molten ash receiving position beneath said opening to a solidified ash discharge position outside of said tank, and means for maintaining a film of water on the molten ash receiving surface of the upper run of said conveyor including a valved water inlet connection to said tank and an adjustable water overflow weir in a wall of said tank.

References Cited in the file of this patent

UNITED STATES PATENTS

| | | |
|---|---|---|
| 961,602 | Gangewere | June 14, 1910 |
| 1,843,274 | Foresman | Feb. 2, 1932 |
| 2,873,554 | Sifrin et al. | Feb. 17, 1959 |
| 2,911,671 | Tolman | Nov. 19, 1959 |
| 2,918,697 | Hardgrove | Dec. 29, 1959 |

FOREIGN PATENTS

| | | |
|---|---|---|
| 568,160 | Great Britain | Mar. 21, 1945 |
| 893,833 | France | Feb. 28, 1944 |